US010181659B2

United States Patent
Bock et al.

(10) Patent No.: US 10,181,659 B2
(45) Date of Patent: Jan. 15, 2019

(54) METHOD FOR MOUNTING A CABLE SHOE

(71) Applicant: NEXANS, Paris (FR)

(72) Inventors: Norbert Bock, Immenreuth (DE); Joan Damian, Untereisesheim (DE); Markus Wall, Floss (DE)

(73) Assignee: NEXANS, Courbevoie (FR)

( * ) Notice: Subject to any disclaimer, the term of this patent is extended or adjusted under 35 U.S.C. 154(b) by 334 days.

(21) Appl. No.: 15/094,185

(22) Filed: Apr. 8, 2016

(65) Prior Publication Data
US 2016/0322716 A1    Nov. 3, 2016

(30) Foreign Application Priority Data

Apr. 29, 2015    (EP) .................................... 15305657

(51) Int. Cl.
*H01R 43/20*    (2006.01)
*H01R 4/38*    (2006.01)
(Continued)

(52) U.S. Cl.
CPC ........... *H01R 4/38* (2013.01); *B60R 16/0215* (2013.01); *H01R 4/305* (2013.01); *H01R 11/12* (2013.01); *H01R 43/20* (2013.01); *H01R 2201/26* (2013.01)

(58) Field of Classification Search
CPC . H01R 9/16; H01R 9/20; H01R 4/305; H01R 4/38; H01R 11/12; H01R 16/0215; H01R 43/20; H01R 2201/26
See application file for complete search history.

(56) References Cited

U.S. PATENT DOCUMENTS 4,288,504 A  *  9/1981  Julian .................... H01R 11/28
                                                          429/179
4,410,226 A  *  10/1983  Adduci .................... H02G 3/10
                                                          174/138 F
(Continued)

FOREIGN PATENT DOCUMENTS

FR           2842656 A1  *  1/2004
WO        2004010539          1/2004

OTHER PUBLICATIONS

Search Report dated 2015.

*Primary Examiner* — Carl Arbes
(74) *Attorney, Agent, or Firm* — Sofer & Haroun, LLP

(57)    ABSTRACT

A method for mounting a cable shoe includes placing the cable shoe in a receiving element, and securely clamping it therein. The receiving element has insulation material, a central throughhole and a first part of a locking mechanism. A central metal insert is arranged into a fastening element made of insulation material. The fastening element is mounted tightly and fixedly on the structural component. The receiving element and the cable shoe are fastened to the fastening element. The fastening element has a second part of the locking mechanism, corresponding in location to the first part of the locking mechanism, such that when the first and second parts of the locating mechanism are engaged, the cable shoe and the receiving element are likewise tightly and fixedly mounted on the structural component.
is indicated which is electrically conductively connected to an end of an electrical line, mounted to a structural component in a motor vehicle. In this connection, a cable shoe with a central throughhole is used which in the mounted position is placed on a rod shaped mass point of the motor vehicle and electrically conductively connected with the same. The cable shoe is initially placed in a receiving element composed of an insulation material and also fastened therein so (Continued)

that there is a central throughhole and a first part of a locking mechanism. There is also a central metal insert used with a central throughhole corresponding to the central throughhole of the cable shoe. The unit of the receiving element, the cable shoe and the insert are also on a fastening element composed of insulation material, the second part of the locking mechanism is mounted tightly and fixedly on the structural component by means of the inter-engaging part of the locking mechanism.

3 Claims, 3 Drawing Sheets

(51) Int. Cl.
*H01R 4/30* (2006.01)
*H01R 11/12* (2006.01)
*B60R 16/02* (2006.01)

(56) References Cited

U.S. PATENT DOCUMENTS

| | | | | |
|---|---|---|---|---|
| 4,531,806 A * | 7/1985 | Hsieh | | H01H 85/044 337/188 |
| 4,832,629 A * | 5/1989 | Sasaki | | H01R 11/01 439/792 |
| 5,292,264 A * | 3/1994 | Blank | | H01R 4/64 439/809 |
| 5,562,490 A * | 10/1996 | Rybolt | | B60R 16/02 439/332 |
| 6,027,382 A * | 2/2000 | Reindl | | B23K 9/20 439/793 |
| 6,042,431 A * | 3/2000 | Hayakawa | | H01R 4/305 439/801 |
| 6,305,338 B1 * | 10/2001 | Kramer | | F02N 11/0848 123/179.3 |
| 7,045,920 B2 * | 5/2006 | Ohuchi | | H02K 3/50 310/179 |
| 7,262,529 B2 * | 8/2007 | Klappenbach | | H02K 3/522 310/71 |
| 9,119,324 B2 * | 8/2015 | Kifer | | H02K 3/522 |
| 2005/0088049 A1 * | 4/2005 | De Filippis | | H02K 3/522 310/71 |
| 2007/0170792 A1 * | 7/2007 | Bott | | H02K 3/522 310/71 |
| 2011/0053434 A1 * | 3/2011 | Seng | | H01R 4/305 439/793 |
| 2011/0057524 A1 * | 3/2011 | Andrieux | | H02K 3/522 310/71 |
| 2014/0063704 A1 * | 3/2014 | Neumeier | | H02B 1/0526 361/679.01 |

\* cited by examiner

METHOD FOR MOUNTING A CABLE SHOE

RELATED APPLICATION

This application claims the benefit of priority from European Patent Application No. 15 305 657.7, filed on Apr. 29, 2015, the entirety of which is incorporated by reference.

BACKGROUND

Field of the Invention

The invention relates to a method for mounting a cable shoe which is electrically conductively connected to an end of an electrical line, is fixedly mounted to a structural component in a motor vehicle, which is used by a cable shoe with a central throughhole, which in the mounted position is placed on a rod shaped mass point of the motor vehicle and is electrically conductively connected to the same as well as to a corresponding arrangement.

Description of Related Art

In a motor vehicle, the chassis constitutes the electrical mass. Cable from a plurality of electrical current circuits, used for supplying the electrical or electronic components in the motor vehicle, must be connected to the mass. For this purpose, metal bolts or metal pins are electrically conductively mounted on various points of the chassis, wherein one or more cables can be simultaneously electrically connected. For this purpose, the cables to be connected are equipped with cable shoes or other electrical connecting elements which can be mounted on the metal bolts or metal pins.

A known mounting arrangement for cable shoes is disclosed, for example, in U.S. 2011/0053434 A1. The mounting arrangement has a base part and a cover part, wherein the connecting area of the cable shoe is radially secured between them. The mounting arrangement is then placed on a grounding bolt so that the cable shoe is electrically connected to the mass. Lastly, the mounting arrangement is securely screwed by means of a nut to the grounding bolt.

FR 2 842 656 A1 describes an arrangement, particularly a motor vehicle heating system, in which each cable shoe equipped electrical line is secured on tubular pins. The cable shoes are directly fastened to the pins. They have a circular collar on which clips are attached in the mounting position, through which the cable shoes are fixed and held in place. In another embodiment the position of the cable shoes on the pins is fixed by means of a cover equipped with projections and locking hooks, that on one hand, rest on the collar of the cable shoes and on the other hand, grip under the collar of the cable shoes.

OBJECTS AND SUMMARY

The invention is based on the object of providing an improved method for mounting a cable shoe a structural component fixedly mounted in a motor vehicle, as well as an improved arrangement for mounting the cable shoe.

This object is met in accordance with the invention in
that the cable shoe is initially placed in a receiving element consisting of insulation material and is clamped securely therein, so that it has a central throughhole and a first part of a locking mechanism,
that additionally, a central metal insert with a central throughhole corresponding to the central throughhole of the cable shoe is arranged and,
the unit of the receiving element, the cable shoe and the insert are also on a fastening element composed of insulation material, the second part of the locking mechanism is mounted tightly and fixedly on the structural component by means of the inter-engaging part of the locking mechanism.

This method makes it advantageously possible to secure the cable shoe in the motor vehicle and the electrical connection of the electrical lines and the electrical devices connected thereto to be carried out in one and the same work step. Therefore, the method is especially efficient and cost effective. The corresponding method is of compact construction, because no separate connections for the electrical lines must be provided.

In accordance with an especially preferred embodiment, the structural component is connected to this secured unit of receiving element and cable shoe on a secured fixed mass point in the motor vehicle, in such a way that the cable shoe is in the mounted position electrically conductively connected to the mass point. With the mounting of the structural element and the prior positioning of the cable shoe on the structural element it is therefore ensured that all the mass lines to be used are connected at previously determined positions to the mass, without an additional work step required.

BRIEF DESCRIPTIONS OF THE DRAWINGS

An embodiment of the subject matter of the invention is illustrated in the drawings, In the drawings.

DETAILED DESCRIPTION

Figure 1:
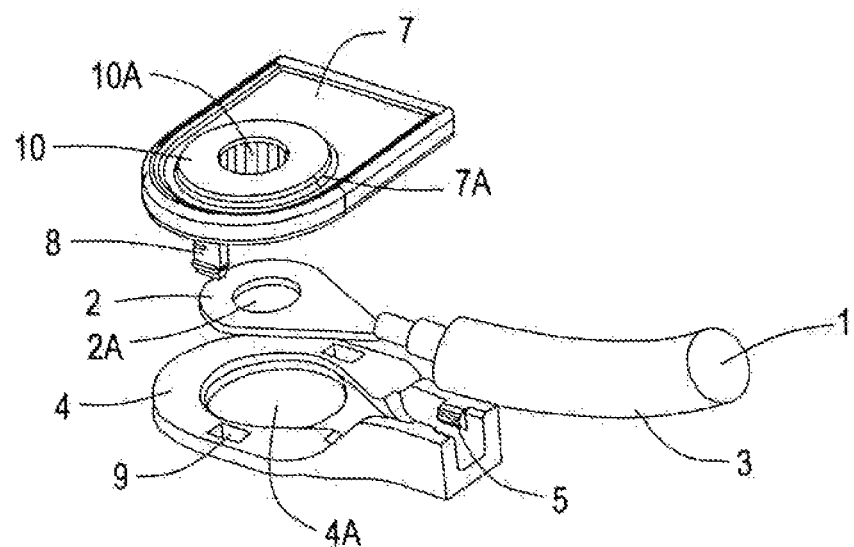
FIG. 1 shows an embodiment of an arrangement according to the invention in the unmounted state.
Figure 2:
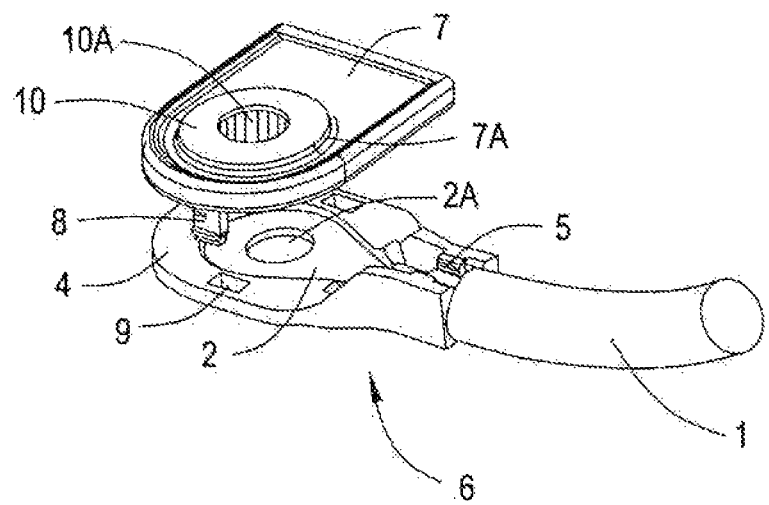
FIG. 2 shows the embodiment of the arrangement according to the invention in the partially mounted state.

An embodiment of the arrangement according to the invention is illustrated in FIG. 1. A cable shoe 2 is electrically conductively connected to the end of an electrical line 1. The electrical line 1 is illustrated with an insulation 3. The cable shoe 2 connected to the electrical line is placed in a receiving element 4. This is illustrated in FIG. 2. The receiving element 4 consists of insulation material. In the illustrated example, the cable shoe 2 is fastened by means of a clamping device 5 in the receiving element 4. The cable shoe 2 forms, with the receiving element 4 by means of a clamping device 5, the unit 6.

This unit 6 is fastened to a fastening element 7. The fastening element 7 is permanently attached to a structural component 11 which is fixedly mounted in the motor vehicle. The receiving element 4 and the fastening element 7 can be connected to each other by means of a locking element 8,9 as illustrated in FIGS. 1 and 2.

Figure 3:
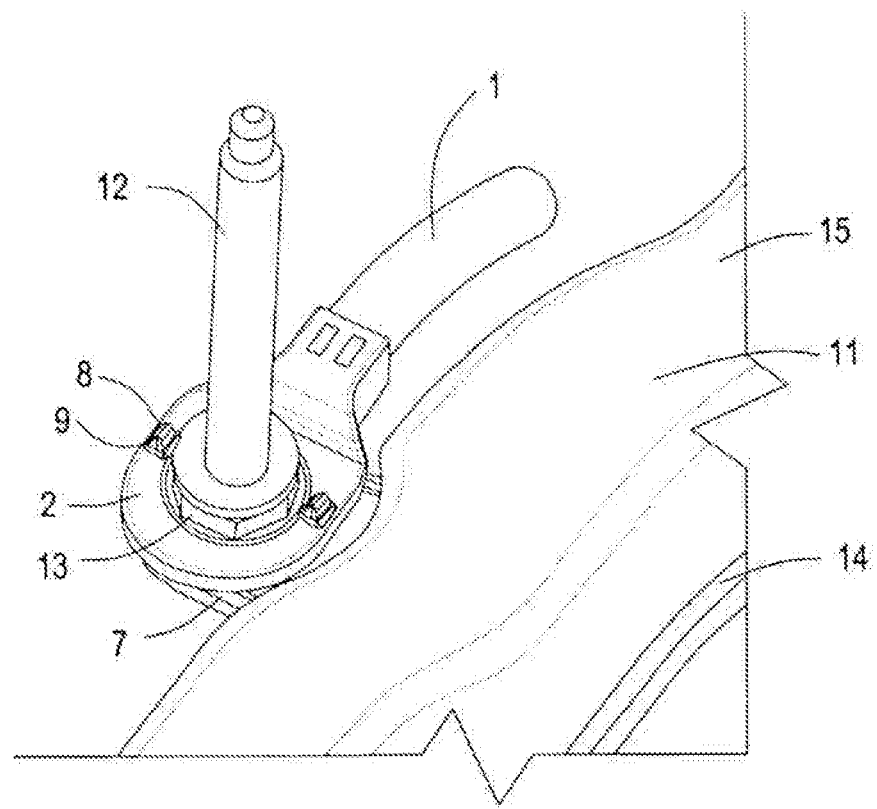
FIG. 3 shows the embodiment of the arrangement according to the invention in a state mounted at a mass point.

The cable shoe 2, the receiving element and the fastening element 7 have each a central throughhole 2a, 4a, 7a. This makes it possible to fasten these three elements to a rod shaped mass point in the motor vehicle in which they are fastened and screwed together in the connected state on the mass point, attached otherwise. The mass point is, for example, a metal bolt or metal rod which is fixedly and electrically conductively attached to the motor vehicle chassis. In this manner, in the mounted position, the cable shoe 2 is electrically conductively connected to the mass point and thereby connected to the chassis. FIG. 3 illustrates such a metal bolt 12 on which the fastening element 7, with the fixedly attached unit 6 composed of the receiving element. 4 and the cable shoe 2, is attached.

The fastening element 7 has a central metal insert 10 (FIGS. 1 and 2). The metallic insert 10 has a central throughhole 10a through which the receiving element 4 can be pushed onto the rod shaped mass point. In the mounted position the flattened part of the cable shoe 2 lies on the metallic insert 10a.

The fastening element 7 with the attached unit 6 composed of the cable shoe 2 and the receiving element 4 are tightly screwed on the metal bolt 12 by means of a nut 13. In this connection, the nut 13 lies on the flattened part of the cable shoe 12. Through the insert 10 and the metallic nut 13, which each lie on the cable shoe 2 in the mounted position, the contact surface of the cable shoe 2 comes in contact with the metal bolt 12 and thereby the mass will be substantially increased and so good. electrical contact is secured.

In the example in FIG. 3, the fixed structural element 11 in the motor vehicle is a cable duct. The housing of the cable duct is composed of a base part 14, on which the fastening element 7 is securely attached, and a cover 15. The fastening of the cable duct on the motor vehicle chassis and the connection of the cable shoe 2, or the cable shoe on the mass, result from one and the same work step in which the cable duct is securely screwed, together with the fastening element 7 and attached unit 6 composed of the cable shoe 2 and the receiving element 4, on the metal rod 12. A method for mounting a cable shoe on a securely attached structural part 11 of a motor vehicle is as follows:

Initially the cable shoe 2 is attached electrically conductively to the end of an electrical line 1. Next, the attached cable shoe 2 is placed in the receiving element and connected thereto. In addition, the cable shoe is fixedly secured in the receiving element as illustrated in FIG. 1 and FIG. 2. Lastly, the unit 6 composed of the receiving element 4 and the cable shoe 2 is fastened on the fastening element 7.

The structural part 11 can, as explained above, be attached to one or more mass points 12 in the motor vehicle chassis, whereby at the same time the cable shoe 2, or the cable shoe electrically conductively attached with the mass, can be connected.

Figure 4:
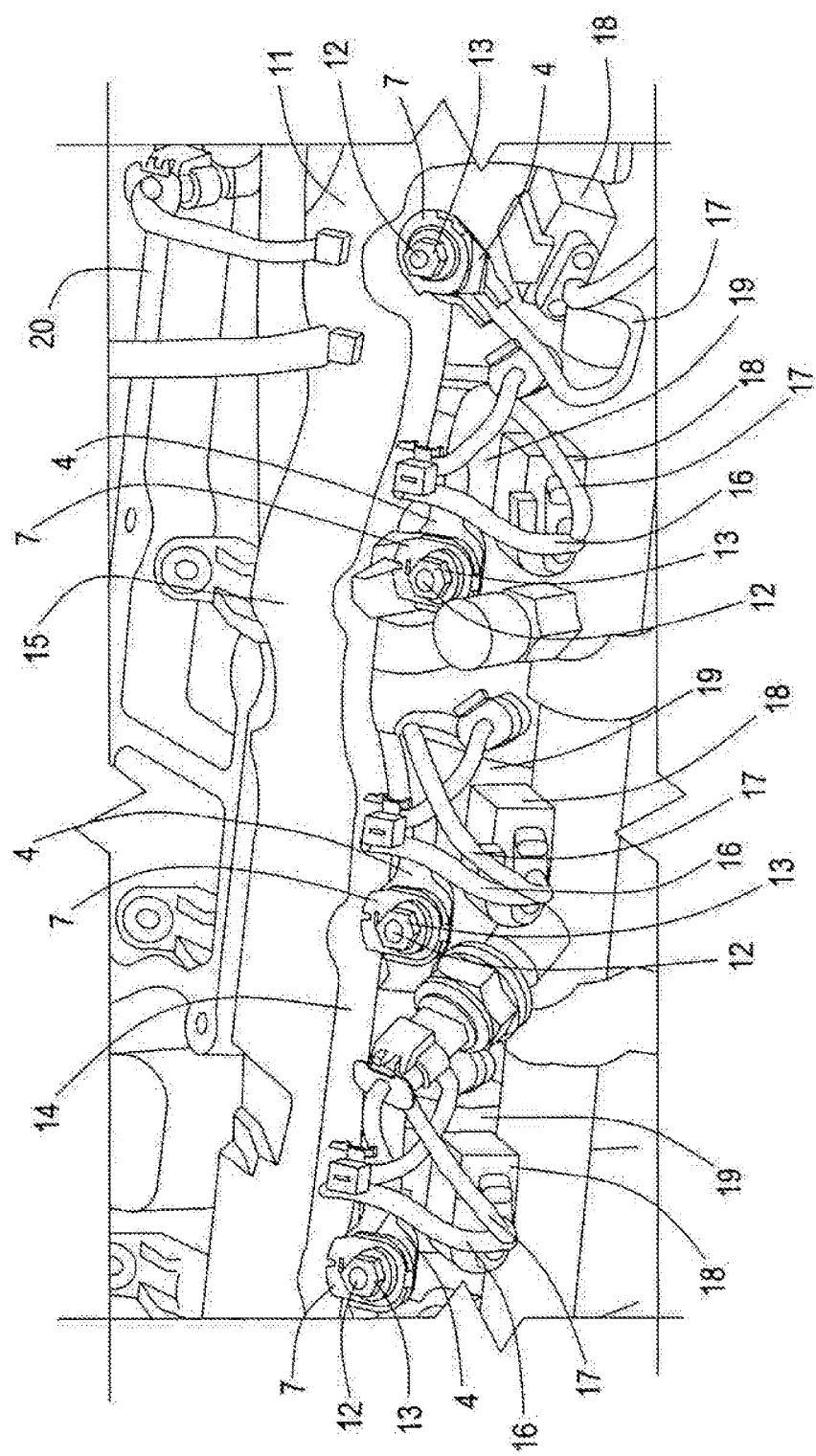
FIG. 4 shows an embodiment of the arrangement according to the invention mounted in the engine compartment of a motor vehicle.

FIG. 4 shows an embodiment of an arrangement according to the invention in the assembled position in an engine compartment of a motor vehicle. The structural part 11 fixedly mounted in the motor vehicle is a cable duct which is composed of a base part 14 and a cover 15. The fastening element 7 is mounted on the base part 14; in the illustrated example they have been manufactured in one work step by an injection molding method with the base part 14. Eleven different lines extend through the cable duct which, for example, are necessary co serve the electrical and electronic components in the motor vehicle, or for signal transmission.

At different points of the cable duct electrical supply cables for ignition coils 19 protrude from the cable duct. The electrical supply cables 16 are attached to the plug 16 which are connected with the ignition coils 19. From the plugs 18 extend mass lines 17 each with cable shoes (FIGS. 1-3) provided.

The cable shoes are each connected by means of receiving elements 4 to the fastening elements 7 of the cable duct. The cable duct with the attached mass cables 17 is tightly screwed on the mass points 12 by means of nuts 13. The mass points 12 are electric lines attached to the motor vehicle chassis. The arrangement according to the invention is suitable especially for the mass connection of the ignition coils, since the mass cable must be a definite length, for example 150 mm, and may not exceed that length.

What is claimed is:

1. A Method for mounting a cable shoe to be electrically conductively connected to an end of an electrical line that is fixedly mounted to a structural component in a motor vehicle, the cable shoe having a central throughhole, which in the mounted position is placed on a rod shaped mass point of the motor vehicle, the rod shaped mass point being electrically conductively connected to the cable shoe, said method comprising the steps of:

placing the cable shoe in a receiving element and securely clamping it therein, said receiving element having insulation material, a central throughhole and a first part of a locking mechanism;

arranging a central metal insert into a fastening element made of insulation material, said fastening element being mounted tightly and fixedly on the structural component; and fastening said receiving element and said cable shoe to said fastening element, where said fastening element has a second part of the locking mechanism, corresponding in location to said first part of the locking mechanism, such that when said first and second parts of said locating mechanism are engaged, said cable shoe and said receiving element are likewise tightly and fixedly mounted on the structural component.

2. The arrangement for mounting a cable shoe according to claim 1, wherein the fastening element with the attached unit, the unit being the receiving element, cable shoe and central metal insert, are firmly attached to a rod shaped mass point of the motor vehicle, so that the cable shoe is electrically conductively connected to the rod shaped mass point.

3. The arrangement according to claim 2, wherein the receiving element and the fastening element are connected to each other by a locking mechanism.

* * * * *